United States Patent
Mizobuchi et al.

(10) Patent No.: US 6,618,464 B2
(45) Date of Patent: Sep. 9, 2003

(54) THICKNESS-MEASURING DEVICE

(75) Inventors: Kiyoshi Mizobuchi, Kagawa-gun (JP); Mitsuaki Kameyama, Takamatsu (JP); Yoshinori Kurokawa, Yokohama (JP)

(73) Assignee: Futec Inc., Kagawa Prefecture (JP)

( * ) Notice: Subject to any disclaimer, the term of this patent is extended or adjusted under 35 U.S.C. 154(b) by 0 days.

(21) Appl. No.: 10/080,510

(22) Filed: Feb. 25, 2002

(65) Prior Publication Data

US 2002/0141534 A1 Oct. 3, 2002

(30) Foreign Application Priority Data

Apr. 3, 2001 (JP) .................................. 2001-104057

(51) Int. Cl.[7] ............................................. G01B 15/02
(52) U.S. Cl. .......................................................... 378/55
(58) Field of Search ...................................... 378/54–56

(56) References Cited

U.S. PATENT DOCUMENTS 3,655,979 A * 4/1972 Jernigan ....................... 378/55
5,202,909 A * 4/1993 Gauje ........................... 378/55

* cited by examiner

Primary Examiner—Craig E Church
(74) Attorney, Agent, or Firm—Arent Fox Kintner Plotkin & Kahn, PLLC

(57) ABSTRACT

A thickness-measuring device comprising (i) an X-ray tube unit including an X-ray tube, (ii) an X-ray detector unit including an X-ray detector having a sensor, and (iii) a means for driving the X-ray tube unit and the X-ray detector unit back and forth, in synchronism with each other, widthwise of an object whose thickness is measured and which runs through a pathline between the X-ray tube unit and the X-ray detector unit. A mask is set above the sensor of the X-ray detector to cover it partly; accordingly, the light-receiving area of the light receiver of the X-ray detector is smaller than the whole area of the sensor. Thus, the measuring area per unit time is reduced effectively.

2 Claims, 7 Drawing Sheets

F I G. 6
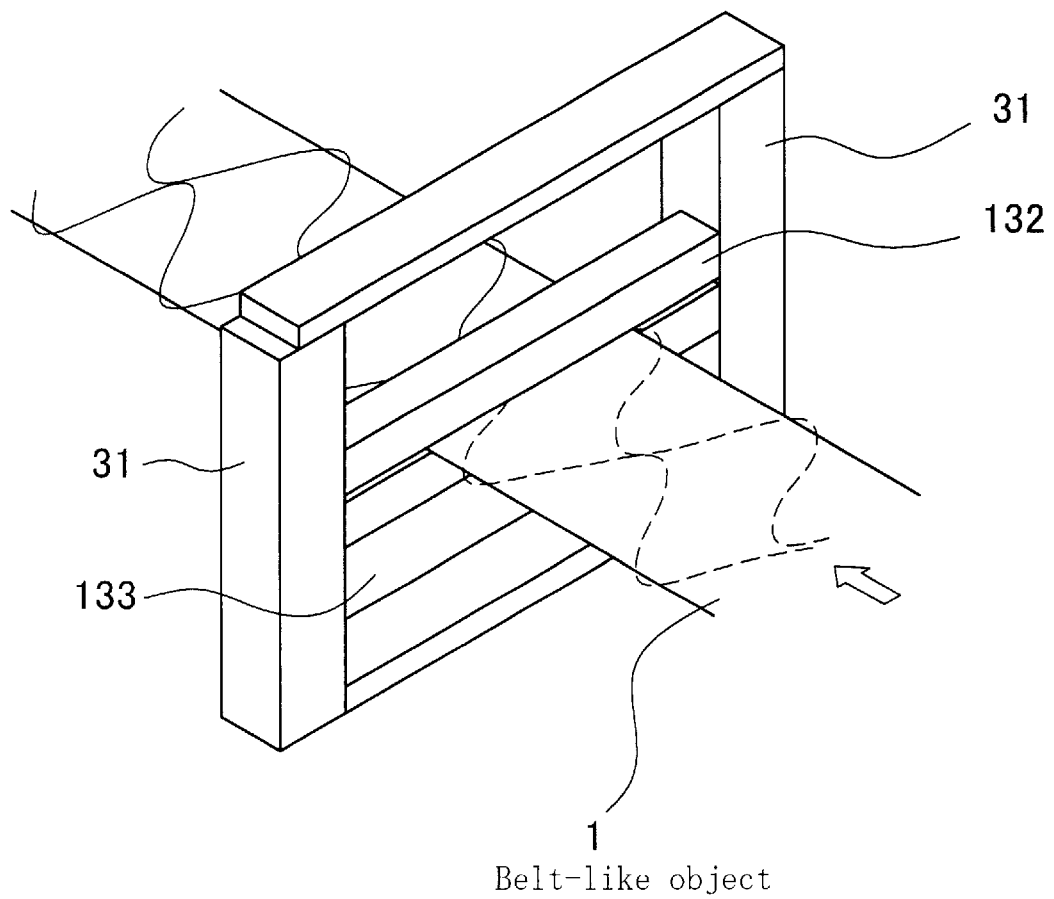
Belt-like object

THICKNESS-MEASURING DEVICE

BACKGROUND OF THE INVENTION

This invention relates to a thickness-measuring device. More specifically, this invention relates to a thickness-measuring device based on a principle that the transmissivity of X-rays depends on the thickness of objects being measured.

FIG. 6 is an illustration to show the basic configuration of a thickness-measuring device. As shown in the figure, upper and lower rails 132 and 133 in a pair are disposed horizontally between right and left frame members 31 and 31 in a pair, a gap left between the upper and lower rails 132 and 133. A belt-like object 1, whose thickness is being measured, is running through the gap in the arrow's direction.

FIG. 7 is an enlarged view of the main portion of the thickness-measuring device. As shown in FIGS. 6 and 7, an X-ray tube unit 10 is set on the upper rail 132 so as to travel back and forth on, and lengthwise of, the rail. The X-ray tube unit 10 comprises an X-ray tube 11 and a case 12, the former built in the latter. The X-ray tube 11 is set downward in the case 12, which has a hole 12h in its bottom to let X-rays through. An X-ray detector 40 is set on the lower rail 133 so as to travel back and forth on, and lengthwise of, the rail. The X-ray detector 40 comprises a sensor 42 and a light receiver 41, the former set on the latter.

The X-ray tube unit 10 and the X-ray detector 40 travel in synchronism with each other on the upper and lower rails 132 and 133, respectively; accordingly, X-rays from the X-ray tube 11 penetrate the belt-like object 1 and reach the light receiver 41 wherever the X-ray tube unit 10 and the X-ray detector 40 are traveling. The energy of light detected by the sensor 42 of the X-ray detector 40 is transformed into an electric pulse and output through a transmitter "K" to a monitor "D". Because the transmissivity of X-rays depends on the thickness of the belt-like object 1, a weak electric pulse is displayed on the monitor "D" if the transmissivity is low and a strong electric pulse is displayed if the transmissivity is high. Zones 1A, where paint containing a magnetic material or the like is applied, are thick and zones 1B, where paint is not applied, are thin; therefore, paint-applied zones 1A and non-paint-applied zones 1B can be distinguished from each other.

The above conventional thickness-measuring device has the following shortcomings.

(1) If the width of paint-applied zones 1A and the width of non-paint-applied zones 1B are larger than the width of the sensor 42 of the X-ray detector 40, the electric pulse output from the sensor 42 is sensitive, distinguishing the paint-applied zones 1A from the non-paint-applied zones 1B. If the width of paint-applied zones 1A and the width of non-paint-applied zones 1B are smaller than the width of the sensor 42 of the X-ray detector 40, the electric pulse output from the sensor 42 is insensitive because the light receiver 41 receives simultaneously X-rays coming through both a paint-applied zone 1A and a non-paint-applied zone 1B; therefore, the measuring precision of the thickness-measuring device is low.

(2) Timing belts are used to drive the X-ray tube unit 10 and the X-ray detector 40 on the upper and lower rails 132 and 133, respectively, in the above conventional thickness-measuring device, which poses the problems of poor feeding precision and positional slippage of measuring points due to the aged deterioration of the timing belts and the problem of pollution of measuring environment due to dust from the timing belts.

In accordance with the above, the object of the present invention is to provide a thickness-measuring device capable of measuring the thickness of objects sensitively, precisely if their thickness varies in a narrow range.

SUMMARY OF THE INVENTION

According to the first feature of the present invention, there is provided a thickness-measuring device comprising (i) an X-ray tube unit including an X-ray tube, (ii) an X-ray detector unit including an X-ray detector having a sensor, and (iii) a means for driving the X-ray tube unit and the X-ray detector unit back and forth, in synchronism with each other, widthwise of an object whose thickness is measured and which runs through a pathline between the X-ray tube unit and the X-ray detector unit. A mask is set above the sensor of the X-ray detector to cover it partly.

According to the second feature of the present invention, there is provided the thickness-measuring device of the first feature, wherein a plurality of pairs of said X-ray tube units and said X-ray detector units are disposed widthwise of the object and a mask is set above the sensor of each X-ray detector to cover it partly.

According to the third feature of the present invention, there is provided the thickness-measuring device of the first feature, wherein the mask covering the sensor is shaped and disposed so as to expose part of the sensor, whose width is smaller than the whole width of the sensor, to X-rays.

According to the fourth feature of the present invention, there is provided the thickness-measuring device of the first feature, wherein the means for driving the X-ray tube unit and the X-ray detector unit in a pair comprises (i) ball-screw rods in a pair which are disposed parallel to each other and on which the X-ray tube unit and the X-ray detector unit travel, respectively, (ii) linear guides in a pair which are disposed along the ball-screw rods, respectively, (iii) servo-motors in a pair which rotate the ball-screw rods, respectively, and (iv) a controller which synchronizes the travel of the X-ray tube unit and the travel of the X-ray detector unit.

The advantage offered by the first feature of this invention is as follows. Because the mask covers the sensor partly, the light-receiving area of the light receiver of the X-ray detector is smaller than the whole area of the sensor. Thus, the measuring area per unit time is reduced. Accordingly, if the thickness of the object varies in a narrow range, the thickness-measuring device measures the thickness sensitively.

The advantage offered by the second feature of this invention is as follows. Because X-ray tube units and X-ray detector units in a plurality of pairs are disposed widthwise of the object, the thickness-measuring device measures the thickness of the object quickly, densely.

The advantage offered by the third feature of this invention is as follows. Because the mask covering the sensor is shaped and disposed so as to expose part of the sensor, whose width is smaller than the whole width of the sensor, to X-rays, the width of the light-receiving part of the light-receiver under the sensor is smaller than the whole width of the sensor. Accordingly, although the sensitivity of the sensor is reduced, there is no practical problem in particular so long as the reduction is confined within a certain range on the one hand, and the measuring area per unit time is reduced effectively on the other hand. Thus, the thickness-measuring device measures the thickness of the object with a high precision, detecting minutes changes of the thickness of the object.

The advantage offered by the fourth feature of this invention is as follows. Because the controller and the servomotors drive the X-ray tube unit and the X-ray detector unit in synchronism with each other on the ball-screw rods, along the linear guides, the thickness-measuring device is free from the problem of poor feeding precision due to the aged deterioration of belts, if used, and hence free from positional slippage of measuring points. Thus, the thickness-measuring device measures the thickness of the object with a high precision. Besides, as the thickness-measuring device does not use a belt, it is free from pollution of measuring environment due to dust from belts.

BRIEF DESCRIPTION OF THE DRAWINGS

The features and advantages of the present invention will become more clearly appreciated from the following description in conjunction with the accompanying drawings, in which:

FIG. 6 is an illustration to show the basic configuration of a thickness-measuring device.

DETAILED DESCRIPTION OF THE PREFERRED EMBODIMENTS

Figure 1:
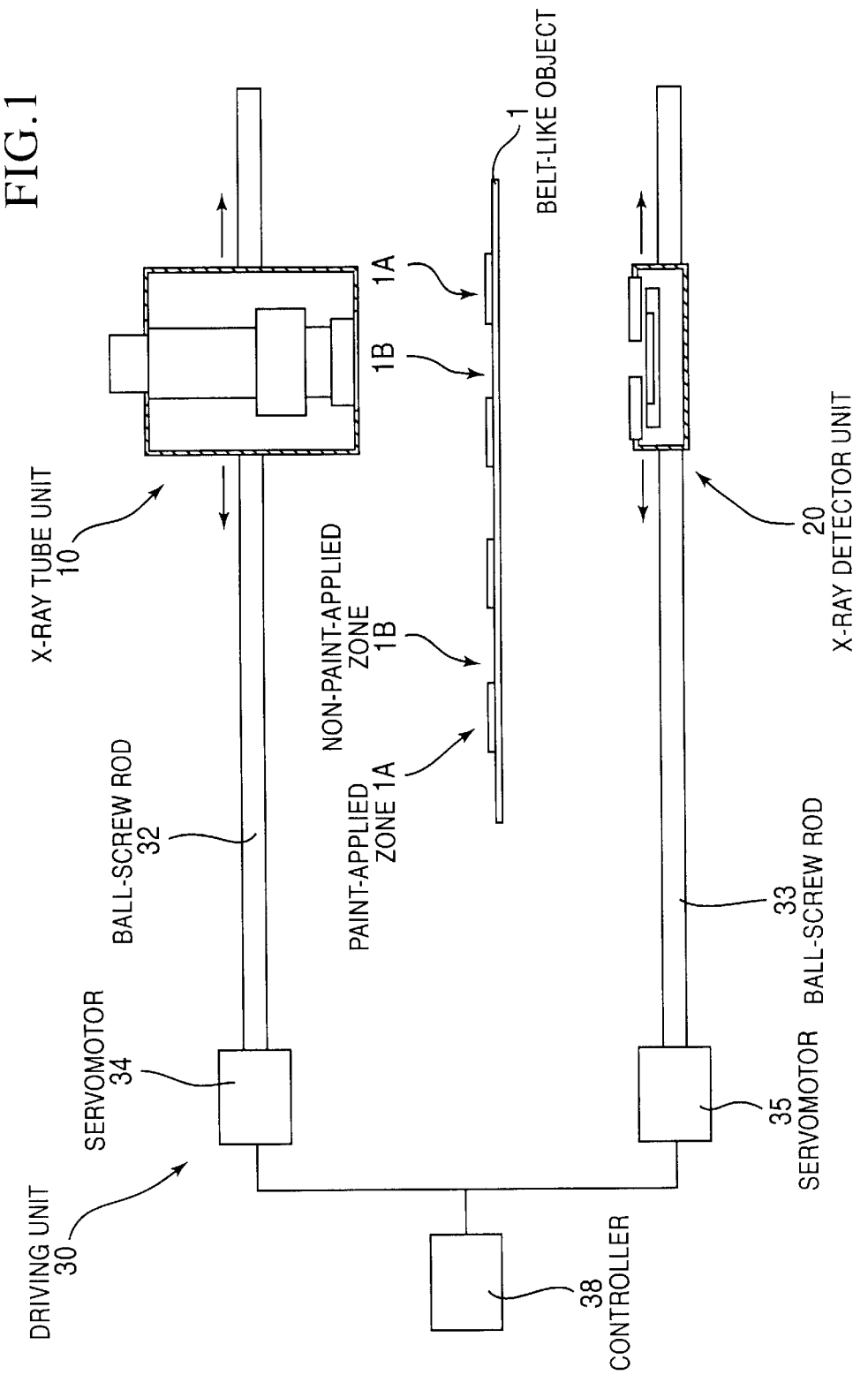
FIG. 1 is a schematic front view of an embodiment of thickness-measuring device of the present invention.

Referring to the drawings, a preferred embodiment of thickness-measuring device of the present invention will now be described.

As shown in FIG. 1, the thickness-measuring device is to measure the thickness of a belt-like object 1 consisting of a base of synthetic-resin film such as polyester film, paper, foil of a non-ferrous metal, or the like and powder of a magnetized magnetic material, a filler, titanium, lead, or the like applied on the base. The thickness-measuring device comprises a driving unit 30, an X-ray tube unit 10, and an X-ray detector unit 20.

The driving unit 30 will be described first.

Upper and lower ball-screw rods 32 and 33 in a pair are disposed horizontally between right and left frame members in a pair (not shown). Servomotors 34 and 35 in a pair rotate the ball-screw rods 32 and 33, respectively. A controller 38 controls and synchronizes the servomotors 34 and 35. Linear guides 36 and 37 in a pair (not shown) are disposed along the ball-screw rods 32 and 33, respectively.

The X-ray tube unit 10 will be described next.

Figure 2:
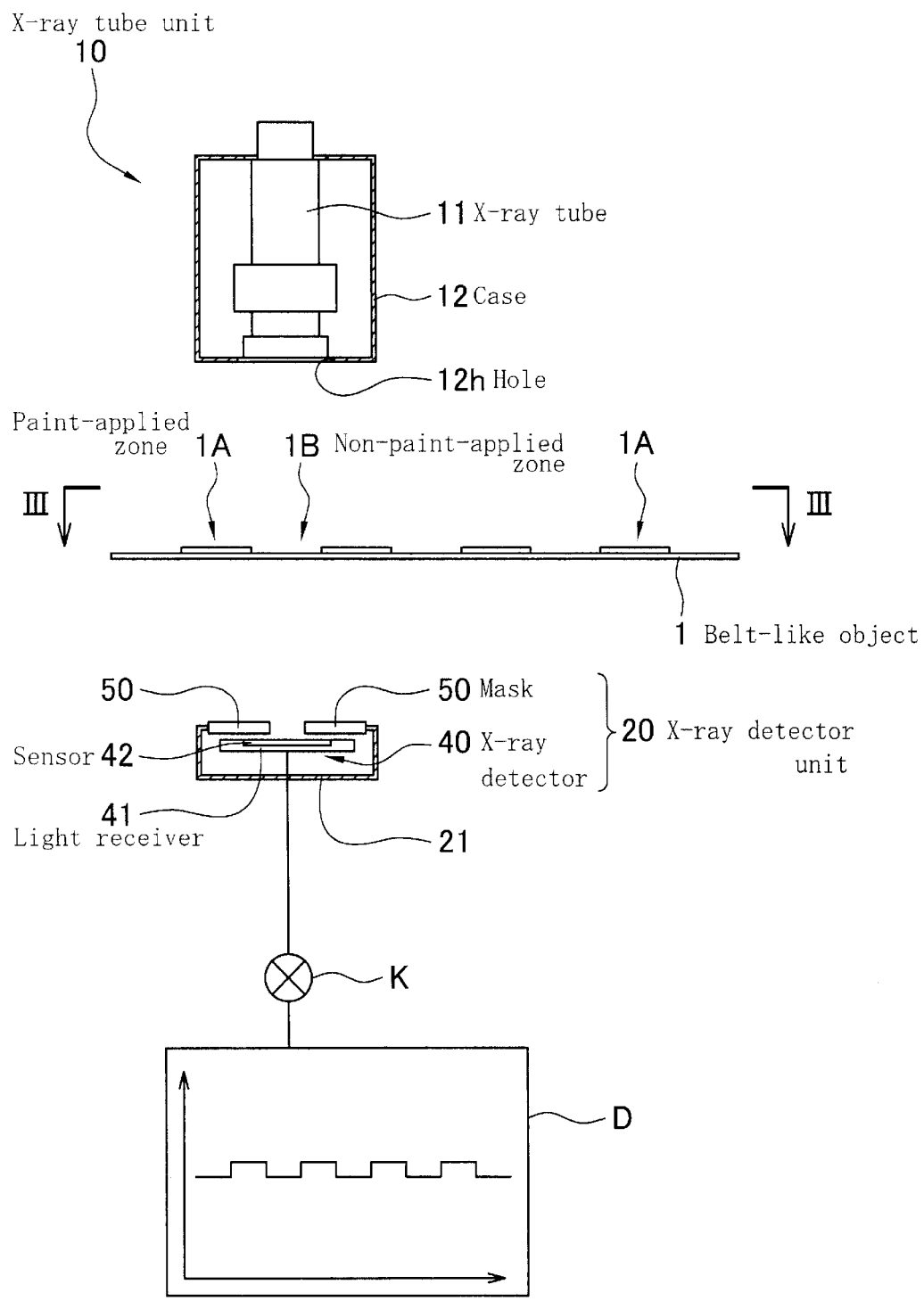
FIG. 2 is an enlarged view of the main part, including the X-ray tube unit and the X-ray detector unit, of the thickness-measuring device of FIG. 1.

As shown in FIGS. 1 and 2, the X-ray tube unit 10 and the X-ray detector unit 20 travel back and forth on the ball-screw rods 32 and 33, respectively. The belt-like object 1 runs through a pathline between the X-ray tube unit 10 and the X-ray detector unit 20. Nuts (not shown) are set on the ball-screw rod 32. The X-ray tube unit 10 has a case 12 and the nuts are fixed to the case 12. Accordingly, when the ball-screw rod 32 is rotated, the X-ray tube unit 10 travels back and forth on the ball-screw rod 32.

The case 12 is of iron and has a hole 12h to let X-rays through. An X-ray tube 11 is disposed downward in the case 12 to radiate X-rays through the hole 12h toward a sensor 42 of the X-ray detector unit 20. Because the case 12 is made of iron, it prevents X-rays from leaking from the other part of the case than the hole 12h.

Accordingly, while the belt-like object 1 is running between the X-ray tube unit 10 and the X-ray detector unit 20, each of the X-ray tube unit 10 and the X-ray detector unit 20 travels back and forth, widthwise of the belt-like object 1, taking a sine-curve course relative to the belt-like object 1. Thus, while the belt-like object 1 is running between the X-ray tube unit 10 and the X-ray detector unit 20, the thickness-measuring device can measure the thickness of any part of the belt-like object 1.

The X-ray detector unit 20 will be described below.

Nuts (not shown) are set on the ball-screw rod 33. The X-ray detector unit 20 has a case 21 and the nuts are fixed to the case 21. Accordingly, when the ball-screw rod 33 is rotated, the X-ray detector unit 20 travels back and forth on the ball-screw rod 33.

Thus, the X-ray tube unit 10 and the X-ray detector unit 20 travel back and forth on the ball-screw rods 32 and 33, respectively, in synchronism with each other under the control by the controller 38.

The X-ray detector unit 20 comprises an X-ray detector 40, a mask 50, and the case 21. The X-ray detector 40 includes a light receiver 41 and a sensor 42 set on the light receiver 41. The mask 50 is set above the sensor 42 to cover it partly. A known X-ray detector can be used as the X-ray detector 40. A photodiode or a photomultiplier, for example, can be used suitably as the light receiver 41. A scintillator, for example, can be used suitably as the sensor 42.

Described below is the mask 50 which is most important in this invention.

Figure 3:
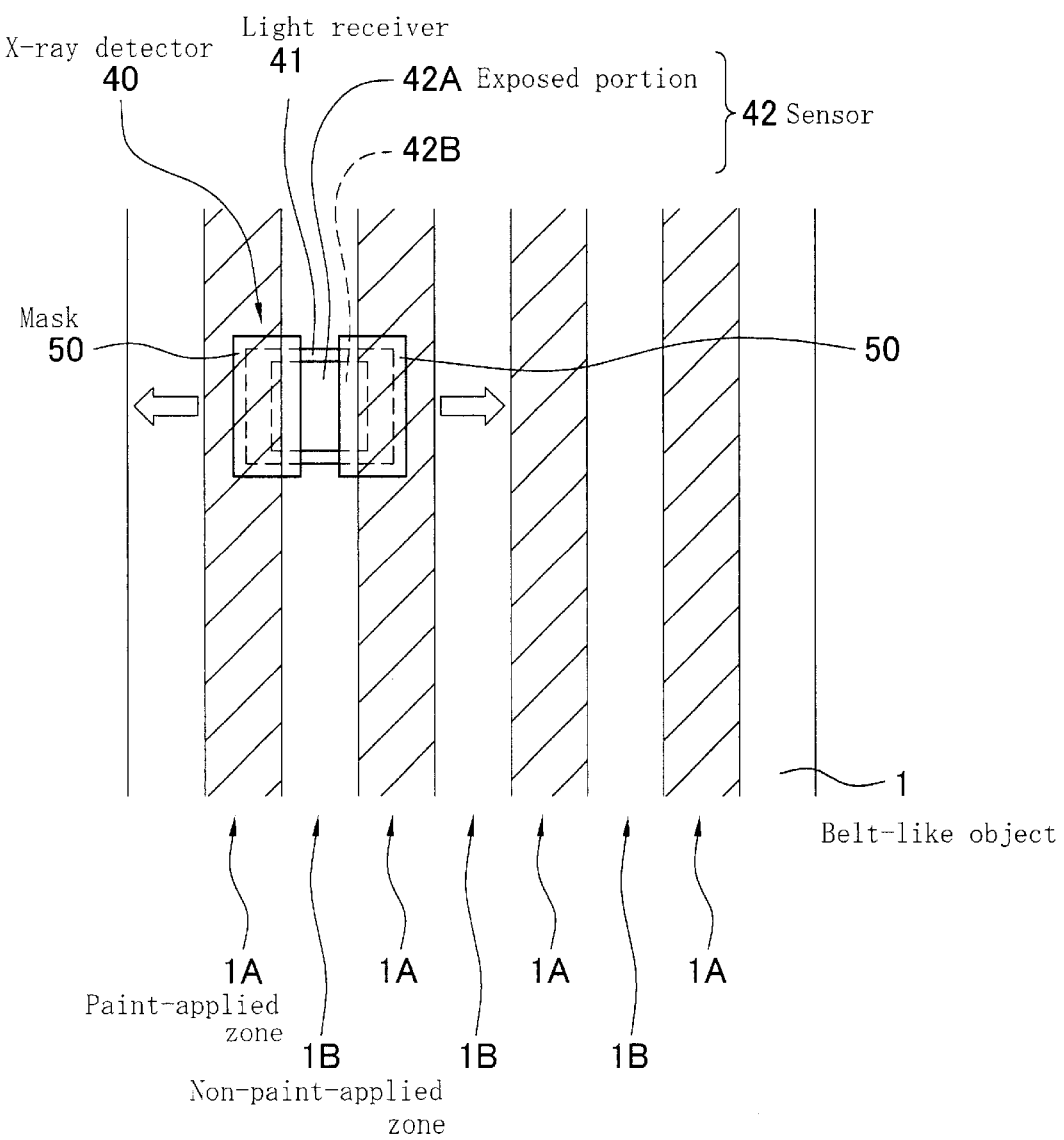
FIG. 3 is a view taken along the arrowed line III—III of FIG. 2.

As shown in FIGS. 1 to 3, the mask 50 is set above the sensor 42 of the X-ray detector 40. The mask 50 is divided into right and left halves as seen in FIG. 3, and the right and left halves of the mask 50 are disposed with a gap of 1 to 10 mm between them to cover a right portion and a left portion of the sensor 42; accordingly, the width of the exposed portion 42A of the sensor 42 as seen in FIG. 3 is smaller than the whole width of the sensor 42.

Instead of a center portion of the sensor 42, a right-side portion and a left-side portion of the sensor 42 as seen in FIG. 3 may be exposed.

If the area of the exposed portion or portions 42A is about 10% or more of the whole area of the sensor 42, the sensitivity of the sensor 42 is adequate.

Now the workings and the effect of the thickness-measuring device will be described.

Figure 4:
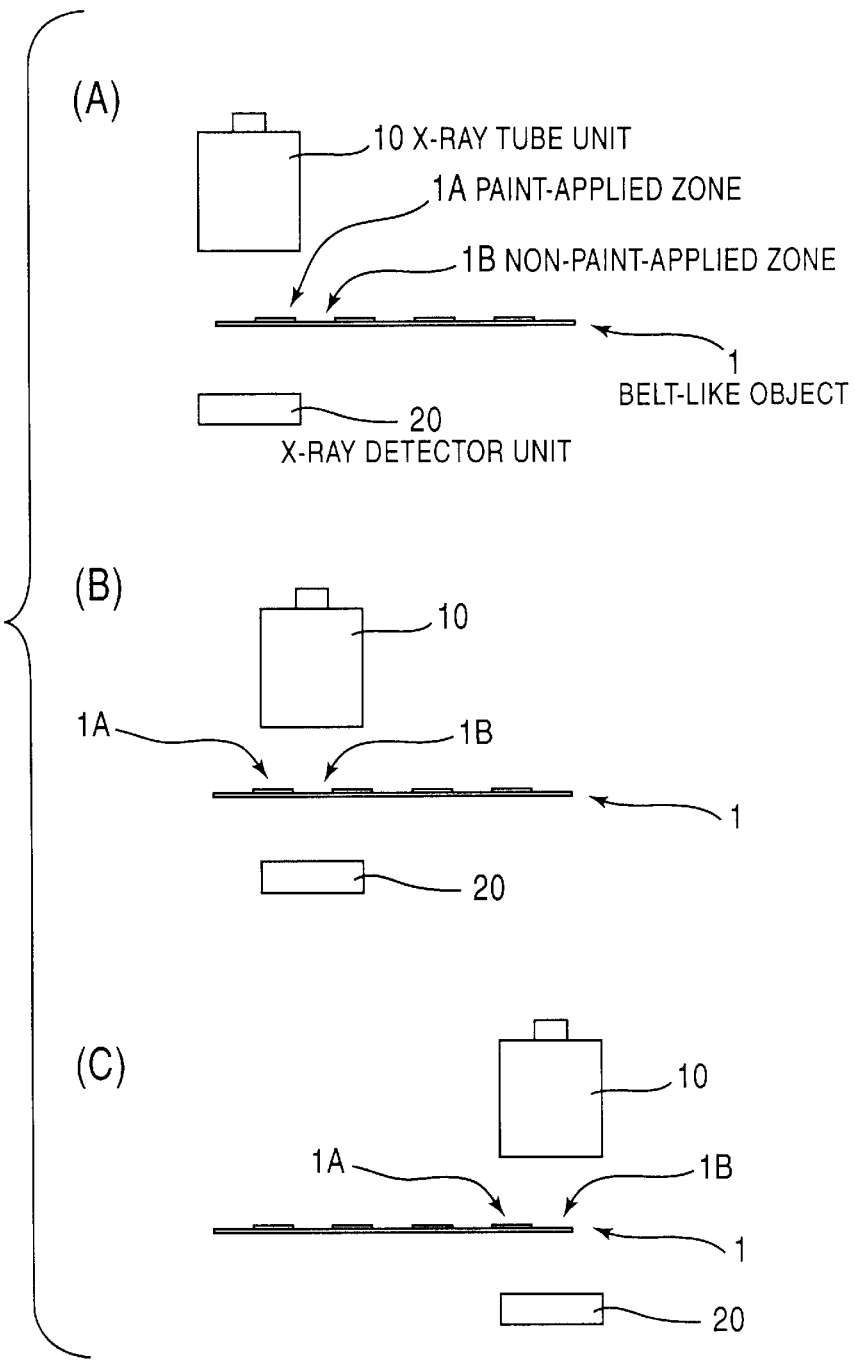
FIG. 4 is an illustration to show the operation of the thickness-measuring device of FIG. 1.

When the X-ray tube unit 10 and the X-ray detector unit 20 travel back and forth on the ball-screw rods 32 and 33 to measure the thickness of the belt-like object 1 as shown in FIGS. 4(A) to 4(C), the following effect is brought about.

First, because the sensor 42 is partly covered by the mask 50, the light receiver 41 receives X rays in an area smaller than the whole area of the sensor 42. Thus, the measuring area per unit time is reduced; therefore, if the thickness of the belt-like object 1 varies in a narrow range, the thickness-measuring device measures the thickness of the belt-like object 1 with a high sensitivity.

Second, because the width of the exposed portion 42A of the sensor 42 is smaller than the whole width of the sensor 42, the width of the light-receiving part of the light receiver 41 is smaller than the whole width of the sensor 42. Accordingly, although the sensitivity of the sensor 42 is reduced, there is no practical problem in particular so long as the reduction is confined within a certain range on the one hand, and the measuring area per unit time is reduced effectively on the other hand. Thus, the thickness-measuring device measures the thickness of the belt-like object 1 with a high precision, detecting minutes changes of the thickness of the belt-like object 1.

Third, because the controller 38 and the servomotors 34 and 35 cause the X-ray tube unit 10 and the X-ray detector unit 20 to travel back and forth in synchronism with each other on the ball-screw rods 32 and 33, along the linear guides 36 and 37, the thickness-measuring device is free from the problem of poor feeding precision due to the aged deterioration of belts, if used, and hence free from positional slippage of measuring points. Thus, the thickness-measuring device measures the thickness of the belt-like object 1 with a high precision. Besides, as the thickness-measuring device does not use a belt, it is free from pollution of measuring environmental due to dust from belts.

As described above, if the thickness of the belt-like object 1 varies in a narrow range, the thickness-measuring device measures the thickness of the belt-like object 1 sensitively with a high precision.

Now another embodiment of thickness-measuring device of the present invention will be described.

Figure 5:
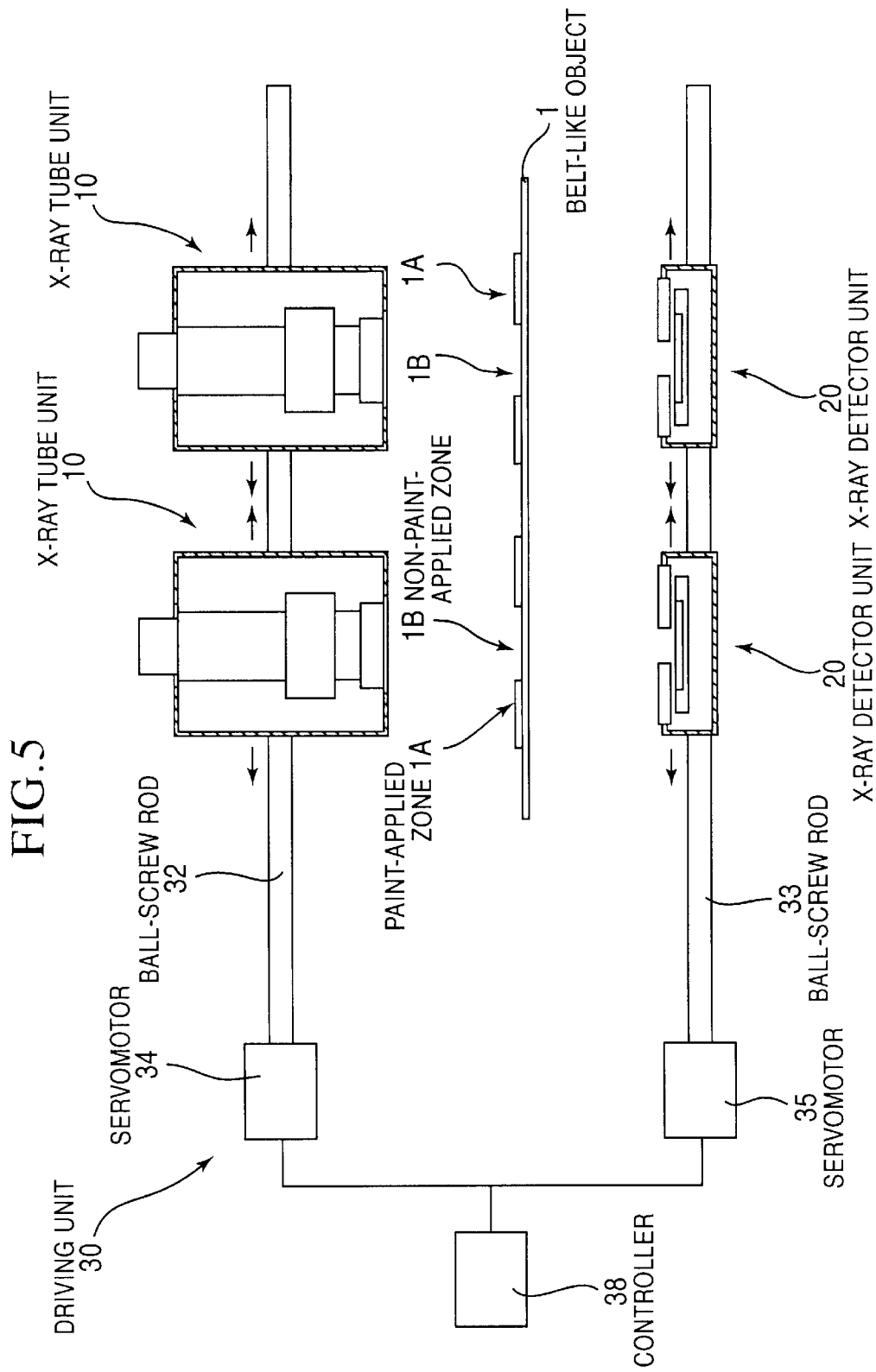
FIG. 5 is a schematic front view of another embodiment of thickness-measuring device of the present invention.
Figure 7:
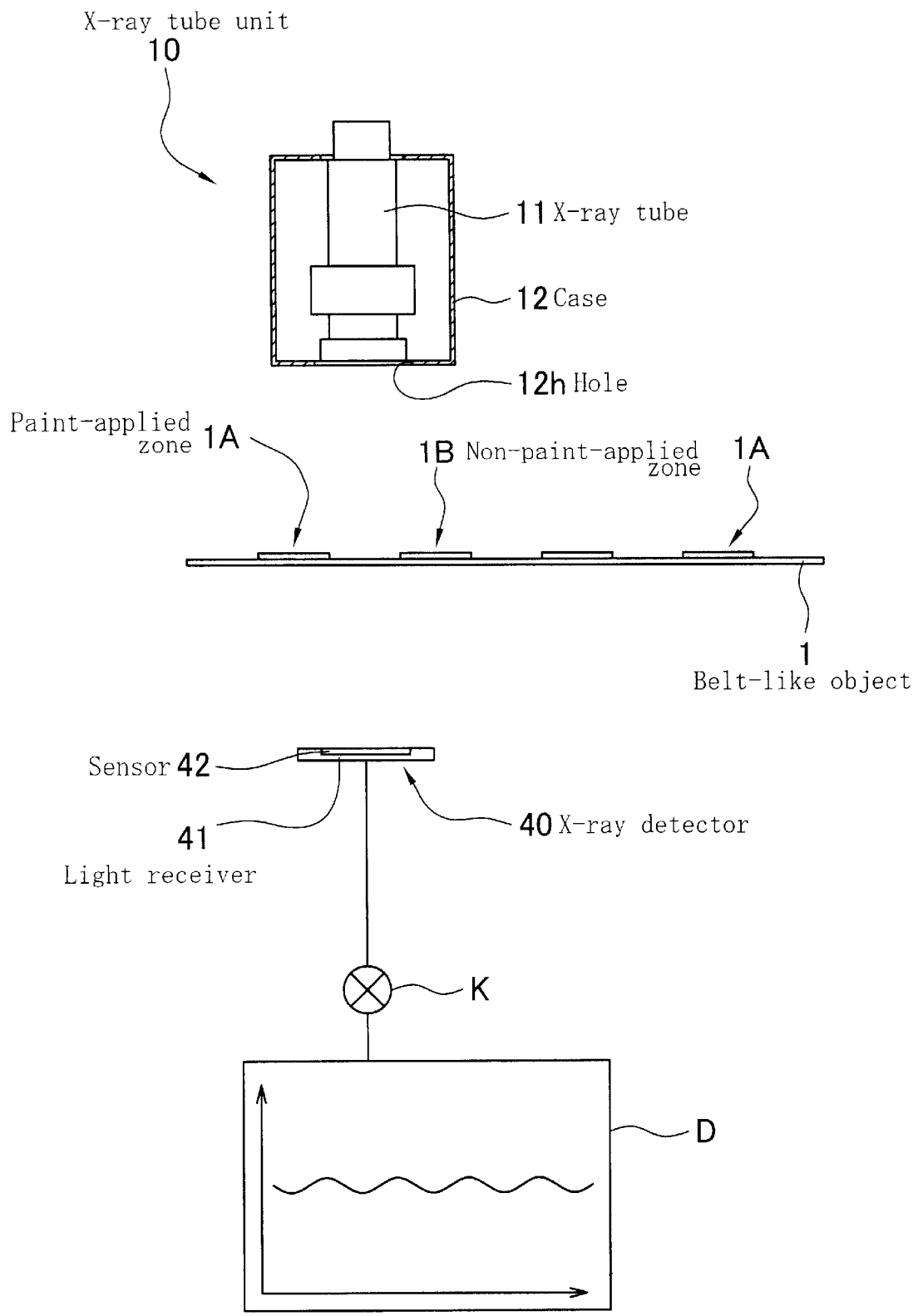
FIG. 7 is an enlarged view of the main portion of the thickness-measuring device of FIG. 6.

As shown in FIG. 5, the thickness-measuring device of this second embodiment has the same configuration as the thickness-measuring device of the first embodiment except for that the former comprises X-ray tube units 10 and X-ray detector units 20 in a plurality of pairs disposed widthwise of a belt-like object 1. As in the case of the sensor 42 of the first embodiment, a mask is set above the sensor 42 of each X-ray detector 40 to cover the sensor 42 partly.

Because the thickness-measuring device has X-ray tube units 10 and X-ray detector units 20 in a plurality of pairs which are disposed widthwise of the belt-like object 1, the thickness-measuring device measures the thickness of the belt-like object 1 quickly, densely.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What we claim is:

1. A thickness-measuring device comprising:

a plurality of X-ray tube units each comprising an X-ray tube disposed widthwise of an object whose thickness is to be measured;

a plurality of X-ray detector units corresponding in number to the plurality of X-ray tube units, each X-ray detector unit comprising an X-ray detector having a sensor disposed widthwise of the object;

a means for driving each X-ray tube unit and a corresponding X-ray detector unit back and forth, in synchronism with each other, widthwise of the object, which runs through a pathline between each X-ray tube unit and the corresponding X-ray detector unit; and a mask being set above the sensor of each X-ray detector to cover it partly.

2. A thickness-measuring device comprising:

a plurality of X-ray tube units each comprising an X-ray tube disposed widthwise of an object whose thickness is to be measured;

a plurality of X-ray detector units corresponding in number to the plurality of X-ray tube units, each X-ray detector unit comprising an X-ray detector having a sensor disposed widthwise of the object;

a means for driving each X-ray tube unit and a corresponding X-ray detector unit back and forth, in synchronism with each other, widthwise of the object, which runs through a pathline between each X-ray tube unit and the corresponding X-ray detector unit, wherein the means comprises:

ball-screw rods in a pair which are disposed parallel to each other on which the X-ray tube unit and the X-ray detector unit travel, respectively, linear guides in a pair which are disposed along the ball-screw rods, respectively, servomotors in a pair which rotate the ball-screw rods, respectively, and a controller which synchronizes the travel of the X-ray tube unit and the travel of the X-ray detector unit; and a mask being set above the sensor of each X-ray detector to cover it partly, wherein said mask is shaped and disposed so as to expose part of the sensor, whose width is smaller than he whole width of the sensor, to X-rays.

* * * * *